United States Patent [19]
Prinz et al.

[11] Patent Number: 5,301,415
[45] Date of Patent: Apr. 12, 1994

[54] METHOD FOR FABRICATION OF THREE-DIMENSIONAL ARTICLES

[76] Inventors: Fritz B. Prinz, 5801 Northumberland St., Pittsburgh, Pa. 15217; Lee E. Weiss, 6558 Darlington Rd., Pittsburgh, Pa. 15217

[21] Appl. No.: 80,995

[22] Filed: Jun. 22, 1993

Related U.S. Application Data

[63] Continuation of Ser. No. 829,767, Jan. 31, 1992, abandoned, which is a continuation-in-part of Ser. No. 620,745, Dec. 3, 1990, Pat. No. 5,126,529.

[51] Int. Cl.$^5$ ............... B23K 26/00; C23C 16/04; B29C 33/38; B23P 25/00
[52] U.S. Cl. .................. 29/458; 29/527.2; 29/527.6; 118/313; 118/504; 118/720; 118/721; 164/46; 264/308; 264/317; 264/221
[58] Field of Search ............ 29/458, 527.2, 527.5, 29/527.6, 423; 118/313, 504, 505, 720, 721; 164/46; 219/121.6, 121.67; 264/221, 255, 308; 427/259, 265, 266, 282

[56] References Cited

U.S. PATENT DOCUMENTS

| | | | |
|---|---|---|---|
| 4,031,268 | 6/1977 | Fairbairn | 427/448 |
| 4,665,492 | 5/1987 | Masters | 364/468 |
| 4,666,743 | 5/1987 | Ohta et al. | 427/448 |
| 4,752,352 | 6/1988 | Feygin | 150/630 |
| 4,775,092 | 10/1988 | Edmonds | 228/222 |
| 4,828,934 | 5/1989 | Pinkhasov | 427/404 X |
| 4,842,186 | 6/1989 | Doyle et al. | 228/222 |
| 4,894,505 | 1/1990 | Malone et al. | 219/76.1 |
| 4,929,402 | 5/1990 | Hull | 427/532 X |
| 4,961,154 | 10/1990 | Pomerantz et al. | 264/255 X |
| 5,059,266 | 10/1991 | Yamane et al. | 427/511 X |

FOREIGN PATENT DOCUMENTS 0322257 6/1989 United Kingdom .......... 39/42

OTHER PUBLICATIONS

"Three Dimensional Printing: Ceramic Tooling and Parts Directly From a CAD Model", by Emanuel E. Sachs, Michael Cima, James Cornie, David Brancazio and Alan Curodeau submitted to the National Rapid Prototyping Conference, Dayton, Ohio, Jun. 4–5, 1990.
"Automated Fabrication of Net Shape Microcrystalline and Composite Metal Structures Without Molds", by David Fauber, pp. 461–462, published in the Manufacturing Processes, Systems and Machines, 14th Conference on Production, Research and Technology, National Science Foundation, Ann Arbor, MI, Oct. 6–9, 1987.
"A Rapid Tool Manufacturing System Based on Stereolithography and Thermal Spraying", by Lee E. Weiss, E. Levent Gursoz, F. B. Prinz, Paul S. Fussell, Swami Mahalingham and E. P. Patrick, published by the American Society of Mechanical Engineers, 1990, pp. 40–48.
"DC Arc Plasma–The Future in the P/M Industry?", by Douglas H. Harris published by ASP-Materials, Inc., Dayton, OH.
Microwave Materials and Devices, J. K. Dillion, Jr., Chairman, "Polycrystalline Ferrite Films for Microwave Applications Deposited by Arc-Plasma"by D. H. Harris, R. J. Janowiecki, C. E. Semler, M. C. Willson and J. T. Cheng, published in the Journal of Applied Physics, vol. 41, No. 2, 1 Mar. 1970.

Primary Examiner—Timothy V. Eley
Attorney, Agent, or Firm—Buchanan Ingersoll

[57] ABSTRACT

A method for forming a three-dimensional object by applying segments of complementary material and deposition material so as to form layers of material. Selected segments of material are then shaped after one or more segment is formed. In this manner, layers of material form a block containing the object made of deposition material and surrounded by complementary material. Then, the complementary material which serves as a support structure during forming is removed. Preferably, the complementary material has a lower melting temperature than the deposition material and is removed by heating the block. The deposition material and complementary material are preferably applied by thermal spray deposition but may be applied by weld deposition, liquid slurry, gravity drop or any manual means such as a hand sifter. It is also preferred but not necessary to use masks when applying the material.

20 Claims, 4 Drawing Sheets

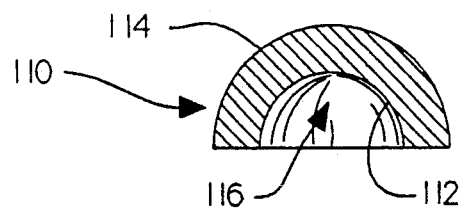
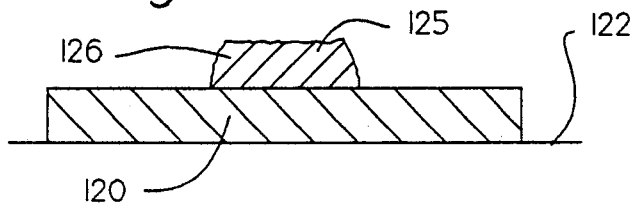
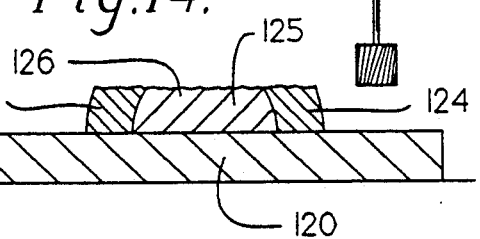
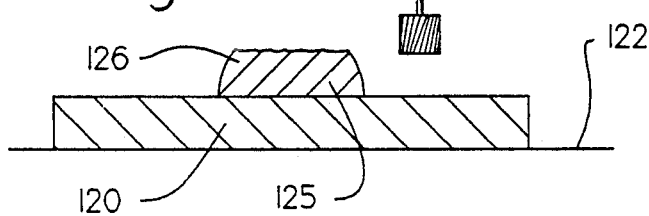
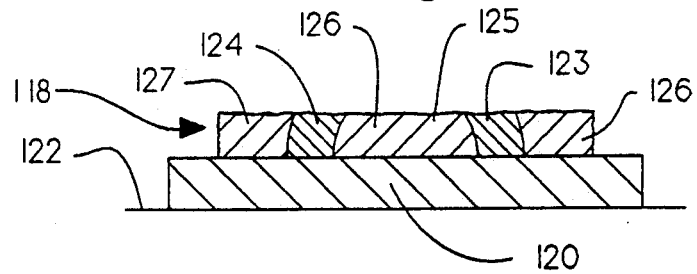
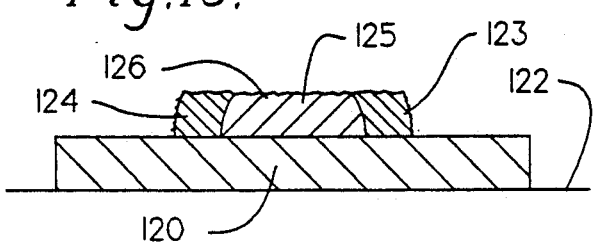
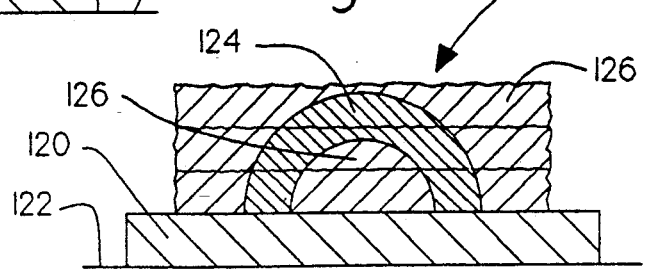

METHOD FOR FABRICATION OF THREE-DIMENSIONAL ARTICLES

RELATED APPLICATION

This application is a continuation of application Ser. No. 07/829,767, filed Jan. 31, 1992 now abandoned which is a continuation-in-part of application Ser. No. 620,745, filed Dec. 3, 1990 now U.S. Pat. No. 5,216,529.

FIELD OF THE INVENTION

The invention relates to a method for creating a three-dimensional object by the formation of layers of a deposited material and support material.

BACKGROUND OF THE INVENTION

Several methods have been proposed and utilized for creating three-dimensional objects by the incremental material build up of thin layers. These processes include lamination, selective laser sintering, ballistic powder metallurgy, three-dimensional printing, stereolithography and near net thermal spraying. Lamination involves the simple process of cutting layers of a selected material and then bonding those layers together. The layers may be pre-cut to shapes corresponding to a cross section through the article to be created. Alternatively, standard shapes of material can be stacked and bonded together. Then, the assembled structure is cut or machined to produce the desired shape. In U.S. Pat. No. 4,752,352, Michael Feygin proposes a computer controlled method and apparatus for forming a laminated object. He provides a supply station, a work station for forming a material into a plurality of layers for lamination, an assembly station for stacking the layers in sequence into a three-dimensional object, a station for bonding the laminations to complete the formation of the three-dimensional object and a control station. In his patent, Mr. Feygin discloses a method in which the laminations are cut from a roll of material lifted, stacked and bonded under the direction of a computerized controller. The layers are bonded together by adhesive or brazing. This and other lamination techniques have several disadvantages. First, the bond between layers is critical and limits the strength of the object. Second, creation of each layer of the laminate also results in the production of significant amounts of waste materials. Third, the resulting object has a layered or serrated edge which must be removed by sanding or grinding. Finally, lamination is suitable for only those materials which can be formed into thin layers which can be bonded together.

In laser sintering, a laser is used to cure a starting material into a certain configuration according to the manner in which the laser is applied to that material. Stereolithography is a more recent yet similar process which creates plastic prototype models directly from a vat of liquid photocurable polymer by selectively solidifying it with a scanning laser beam. An example of this method is described in European Patent 322 257. Both of these methods require a substantial amount of curable raw material. In both cases the laser must be carefully controlled to achieve the desired shape. In some applications, the laser typically does not fully cure each cross section. Rather, the laser cures the boundary of a section and then cures an internal structure or honeycomb that traps the uncured fluid. Thereafter, the article must be subjected to final curing under separate ultraviolet lights or heat treatment. Additional post processing, such as careful sanding and grinding, is required for making smooth, accurate surfaces.

In ballistic powder metallurgy beams of particles are directed to the coordinates of a three-dimensional object in a three-dimensional coordinate system. A physical origination seed to which the particulate matter is attracted is required. The process may use a beam of particles directed to the origination seed which builds the particles upward from that seed. Alternatively, one can use an energy beam which attracts the particulate matter already in the environment to the seed or another coordinate. Such a system is disclosed by William E. Masters in U.S. Pat. No. 4,665,492. This method cannot be used to make objects having undercuts therein without creating support structures at the same time. Normally, the support structures are created with the particle beam during the creation of the object. Such support structures must be removed by cutting, grinding, machining or melting.

Three-dimensional printing is another technique similar to ballistic powder metallurgy. One variation of this technique creates layers of particles to produce a three-dimensional image in much the same manner that an ink jet printer produces two-dimensional images. The technique relies upon thermal shock or drop on demand material delivery techniques. A thermal shock technique forms a particle by vaporizing a small area of the fluid directly behind the nozzle. The drop on demand nozzle includes a piezo electric element to constrict the cavity thereby forcing a drop past the nozzle plate. In both instances the material is directed to a work surface in a manner to build up the article. This technique can only be used for certain kinds of materials.

In another variation of three-dimensional printing a series of two-dimensional layers are created by adding a layer of powder on top of a work surface. The powdered layer is selectively joined where the part is be formed by ink jet printing of a binder material. The work surface is then lowered and another layer of powder is spread out and selectively joined. The layering process is repeated until the part is completely printed. Following a heat treatment the unbonded powder is removed leaving the fabricated part. Although this technique has been proposed for metal, ceramic and plastic materials, it is limited to those materials to which a reliable binder can be applied.

None of the just described fabrication techniques have been successfully used to make parts of a variety of materials. For example, the art has attempted to make objects by spraying layers of metal on a substrate. Problems have occurred in that the layers have tended to camber and possibly to peel apart from the substrate. Therefore, one must have a release agent or compatible substrate. Also, the incremental buildup techniques of fabrication known in the art typically produce stepped surfaces when an angled profile is desired. The stepped surfaces require increased post-manufacturing grinding and polishing.

There is a need for a method to manufacture quality parts of a variety of materials by incremental build-up of the chosen material. The method should be capable of producing articles having undercuts and irregular shapes. The method should also require very little final machining after the build-up of material has been completed.

BRIEF DESCRIPTION OF THE INVENTION

We provide a method to manufacture a three-dimensional object by incremental material build up of thin layers. In one embodiment, each layer is composed of two portions. A first portion shape represents a cross sectional slice of the three dimensional object being built and is composed of the desired deposition material. The second portion is the complement of the object shape of the first portion and serves as a structure which supports the growing object form and as a self-anchoring substrate. Both portions are applied by any preferred means such as thermal spray deposition, weld deposition, liquid slurry, gravity drop or a manual device such as a hand sifter. In another embodiment, each layer is composed of only deposition material. We prefer to use this embodiment when the manufactured object has no undercuts. When the object to be manufactured has no undercuts, each layer is fully supported by a previously deposited layer. Thus, no complementary material is needed.

There are two sets of masks employed in one preferred method. A first set of masks is defined that contains at least one mask corresponding to each cross section through an article such that there is at least one mask in every set for every parallel cross section normal to a center line through the article. A second set of masks is defined that contains at least one mask corresponding to each mask from the first set of masks and defines a complement to the cross section defined by that corresponding mask. In this preferred method, the deposition material is applied over a mask selected from a first set of masks. The complementary material is applied over a mask selected from a second set of masks. The masks are alternately placed on a work surface, the deposition material or the complementary material is applied, then the masks are removed. Thus, a layer is produced on the work surface, a portion of the layer being complementary material and a portion being deposition material. The masks are placed, the materials are applied and the masks are removed in accordance with a predetermined sequence so that a plurality of layers, each placed upon the previous layer, are formed. In this way, a layered structure is built up which contains the object made of the deposition material surrounded by the complementary material.

For each layer, both of, one of or neither of the complementary material and the deposition material is shaped as needed to produce the desired object. Such shaping may be accomplished by any suitable material forming method and includes milling, grinding, contouring, sanding, smoothing, edging, drilling and polishing. Preferably, the shaping occurs after material is applied and before the subsequent layer is applied. This shaping can occur immediately after application or can be delayed. The material may be shaped after one or more subsequent layers have been applied. Delaying several layers before shaping can eliminate multiple shaping of the same profile that becomes necessary when a subsequent layer melts the profile of an underlying layer.

In another embodiment, the primary material and the complementary material are applied without masks being placed between the material delivery means and the work surface. In this embodiment either the deposition material or the complementary material is applied, then that material is shaped which may include creating a cavity in the shaped material. The other material is then applied. Then the layer is ground or shaped as needed to remove excess material. The process is repeated until all layers have been placed.

In yet another embodiment, only one set of masks is used in the formation of the object. The first manner in which this is done involves first applying a layer of complementary material. The complementary material is then shaped so as to achieve a desired surface. A mask from the first set of masks is then put into position and the deposition material is applied.

A second manner in which one set of masks is used for the formation of the object involves placing a mask from the second set of masks into position and applying the complementary material. The complementary material is then shaped and the deposition material is applied. Once the deposition material is applied, it is ground down to the appropriate level for that layer.

For each embodiment, after the final layer has been applied, the complementary material is removed leaving the created object. We prefer to use a complementary material having a lower melting point than the deposition material. Therefore, the complementary material can easily be removed by heating.

We prefer to produce masks in a manner to avoid any island feature in the masks. To do this we define at least two masks for each cross section of the object or support material. We further prefer to position these masks so that any seams in the deposited material do not align, but crisscross.

Other objects and advantages of the invention will become apparent in connection with the description of the preferred embodiments shown in the following figures.

DESCRIPTION OF THE DRAWINGS

FIG. 10 is a side view of another article to be created.

FIG. 11 is a sectional view showing a step of a preferred method for creating the article of FIG. 10 in which complementary material is applied to a substrate.

FIG. 12 is a sectional view of another step of the preferred method in which the complementary material is shaped.

FIG. 13 is a sectional view of yet another step of the preferred method in which a deposition material is applied around the shaped complementary material.

FIG. 14 is a sectional view of yet another step of the preferred method in which the deposition material is shaped.

FIG. 15 is a sectional view of yet another step of the preferred method in which complimentary material is applied around the deposition material.

FIG. 16 is a sectional view of yet another step of a preferred method in which several layers have been formed by the preceding steps.

DESCRIPTION OF THE PREFERRED EMBODIMENTS

Figure 1:
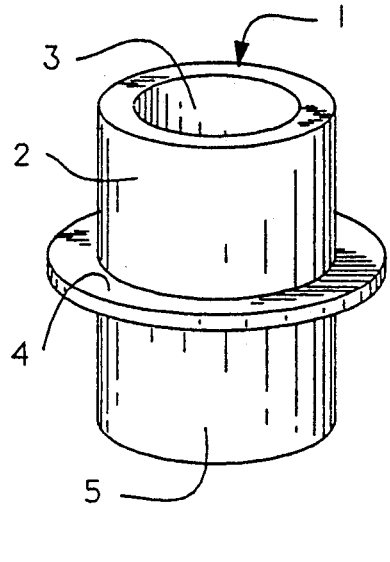
FIG. 1 is a perspective view of an article to be created.

In FIG. 1 we show an article 1 which can be manufactured in accordance with our method. Article 1 is comprised of an upper tubular portion 2 and lower tubular portion 5 separated by collar 4. Article 1 is hollow as indicated by passageway 3, and is made of any appropriate material such as metal, metal alloy, ceramic, plastic or composite. The material of which article 1 is fabricated is hereinafter referred to as the deposition material. The material that surrounds and supports article 1 during fabrication is hereinafter referred to as the complementary material. In the present invention, any means of delivering the deposition material and the complementary material is acceptable, however, in the preferred embodiment of the present invention, we employ a thermal spray deposition means. The preferred embodiment also employs two sets of masks, and a shaping means. A first set of masks is defined that contains at least one mask corresponding to each cross section through an article such that there is at least one mask in every set for every parallel cross section normal to a center line through the article. A second set of masks is defined that contains at least one mask corresponding to each mask from the first set of masks and defines a complement to the cross section defined by that corresponding mask.

Figure 2:
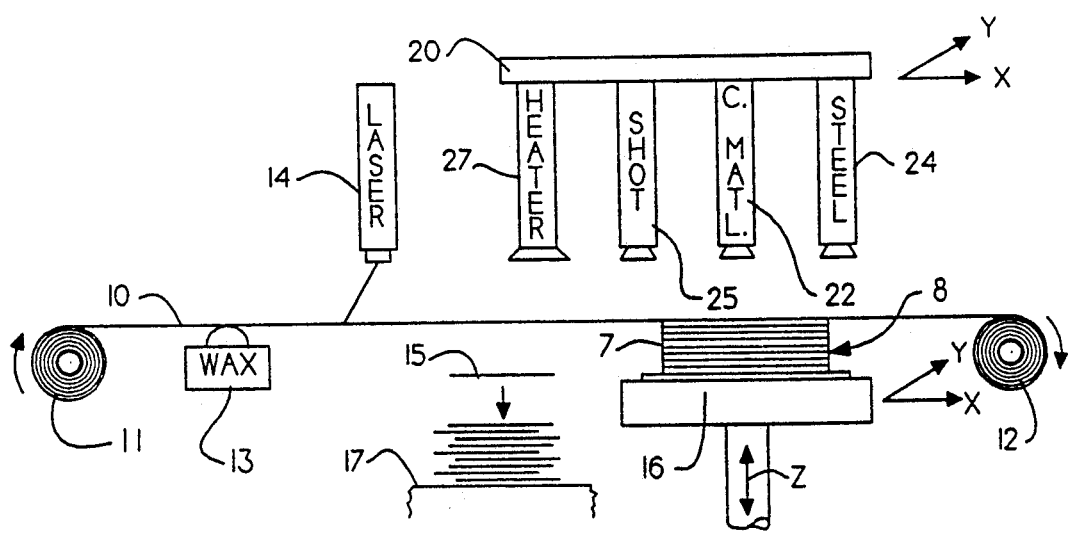
FIG. 2 is a diagram showing a preferred apparatus that performs the present preferred method of making three-dimensional objects such as the article shown in FIG. 1.
Figure 4:
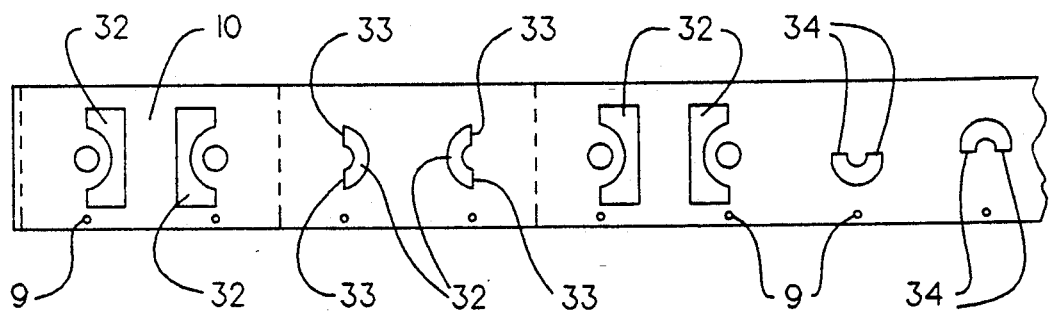
FIG. 4 is a top plan of a strip of mask material in which different masks have been cut to make the article of FIG. 1.
Figure 6:
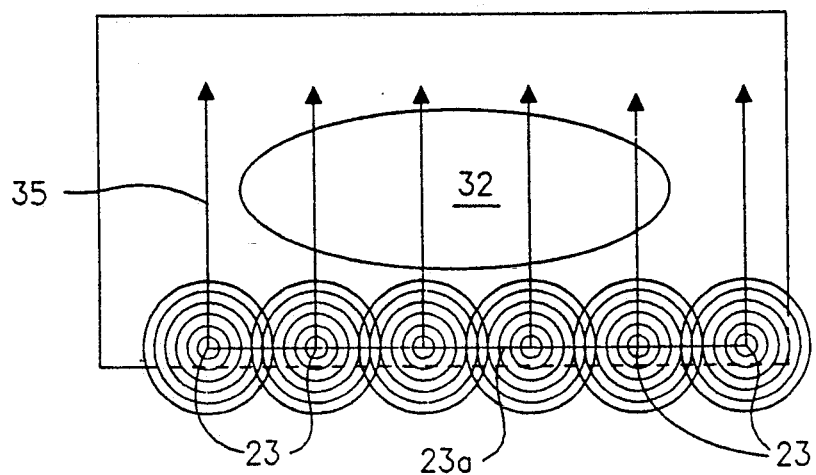
FIG. 6 is a diagram showing a multiple spray pattern using multiple spray sources.

Referring to FIG. 2, the masks are positioned over a work table 16. Work table 16 preferably is capable of moving in three directions as indicated by arrows x, y and z. A sequence of masks, some of which are shown in FIG. 4, are moved over the table and when a set of masks reaches a desired position above table 16, head 20 is moved in a manner to direct the delivery of deposition material from spray gun 24 or complementary material ("C. MATL.") from spray gun 22. One preferred pattern of motion is shown in FIG. 6. In this way, a layer 7 is formed with a portion of the layer consisting of deposition material and the remaining portion of each layer consisting of complementary material. In the preferred embodiment, the complementary material is sprayed first. Therefore, a set of masks corresponding to the complementary material is positioned above table 16 and the complementary material is sprayed. This set of masks is then removed. After the complementary material has been sprayed, a shaping means (not shown in FIG. 2) such as a grinding, milling or other shaping tool shapes the complementary material as needed to its final shape. The next set of masks corresponding to the deposition material is positioned and the deposition material is sprayed. The deposition material is then shaped as needed. Although we prefer to move the spray guns during deposition, one could also use a fixed spray gun and move the work surface 16. In the apparatus of FIG. 2, the work surface 16 would be moved out from under mask material 10 to permit shaping of the deposited material. After each layer is completed, work table 16 is dropped to allow for application of the next layer. The process is then repeated for each layer until the final block of material is produced.

Figure 3:
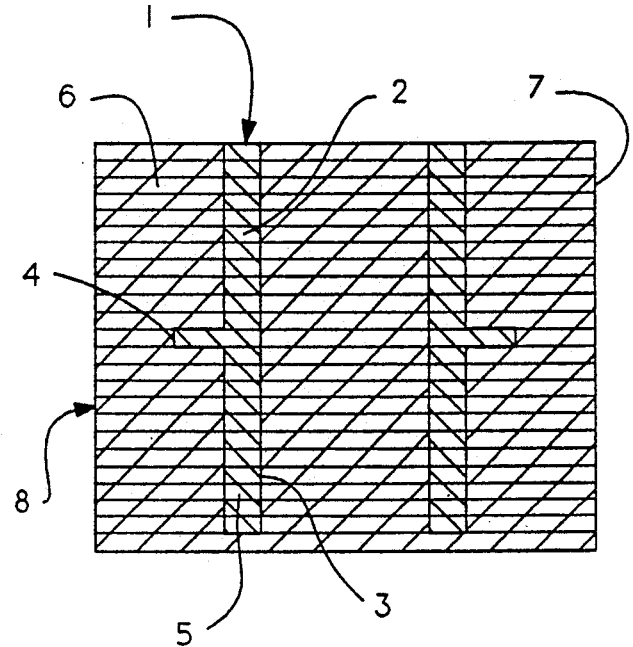
FIG. 3 is a cross sectional view of the block of sprayed material for making the article shown in FIG. 1.

Upon completion of the process, one will have a block of material 8, a cross section of which is shown in FIG. 3. Because we have deposited a complementary material 6 with the deposition material, we are able to create intricate shapes and parts having undercut portions. For the particular object of FIG. 1, the complementary material 6 supports the deposited collar material 4. The complementary material must be removed from the block of material. We prefer that the complementary material have a melting point lower than the melting point of the deposition material. If that occurs the block 8 of material shown in FIG. 3 can be heated to a temperature so that complementary material 6 can be heated and melted away from the object 1. We have found that if the article is to be fabricated in steel or zinc, a metal alloy or polymer having a melting temperature between approximately 150° to 340° F. makes a suitable complementary material. Such alloys are manufactured by Cerro Metal Products Company of Belafonte, Pa., and sold under the trademark of Cerro.

Although the masks used for our technique could be produced separately by any means, we prefer to use a single apparatus, shown in FIG. 2, for producing the masks and spraying the layers. Generally, we provide a masking material 10 in roll form on roller 11 which passes to take-up roll 12. At station 13, wax of an adhesive material can be applied to the under surface of the masking material or one could use pressure sensitive paper. This material may be a metal foil paper, reinforced paper or other suitable material. We have found that paper can be used as a masking material for making an object of stainless steel utilizing a low melting point alloy as the complementary material. The masking material passes under a laser 14 and a mask is cut by the laser. The cut away portion 15 of the masking material 10 drops from the moving mask material onto a surface 17 for disposal. Fiducial markers 9 may also be cut out to provide for precise alignment of the mask 10 over the substrate. The substrate is seated on a set of servo controlled x-y-z (and perhaps rotary) stages. The x-y stages may be integrated with an optical sensing system, which detects the fiducial markers, to precisely align the mask over the substrate. The z-stage drops the substrate by the thickness of each layer, between consecutive layers. The masking material may be of any appropriate material such as paper, plastic, or metal. If a metal or plastic is used, then the thermal spray may cause sections of the mask to move around under the spray turbulence. Therefore, a "sticky" surface may have to be applied to the backside of the roll, for example by wax station 13, to hold the mask in place against the substrate. Alternatively, one could use pressure sensitive paper for the masks.

The art has observed in some metal spray processes that residual stress develops in the sprayed metal layer causing the layer to camber and possible to peel. To relieve the stress the art has shot peened such layers. The technique is only successful in situations where shot is evenly applied over the layer. Since our layers are flat, we can use this technique. Therefore, we prefer to provide a shot peener 25 for shot peening each layer.

It is also possible to relieve the stress by induction heating. Therefore, we alternatively provide an induction heater 27 which we move over each layer to selectively heat the surface. Such heating is easier to accomplish on flat layers rather than on curved and irregular surfaces.

Since each layer is comprised of two materials, at least one mask per layer may require an "island" feature (i.e., a region unconnected to the mail roll), which is physically not realizable. For example, if a deposition material cross-section is circular, then the support structure mask would require a frame with a circular island. To handle this situation, two masks, and thus two spray sequences, are required to form "island" features (FIG. 4). Thus, if a particular layer of the main shape has holes in it, then at least four masks 32 are required; two to form the support structure of complementary material and two to form the structure of deposition material.

With the aforementioned approach there may be seams in the spray deposition between boundaries of contiguous sections formed with two masks. This may be deleterious to the over-all part strength and its fatigue characteristics. To minimize this problem, the masking operations should be planned so that the seams between consecutive layers do not align but criss-cross. For example, FIG. 4 shows the masks for two layers of a cylinder. Here corresponding edges 33 and 34 for two mask pairs are positioned so that edges 33 and 34 are at right angles.

Figure 5:
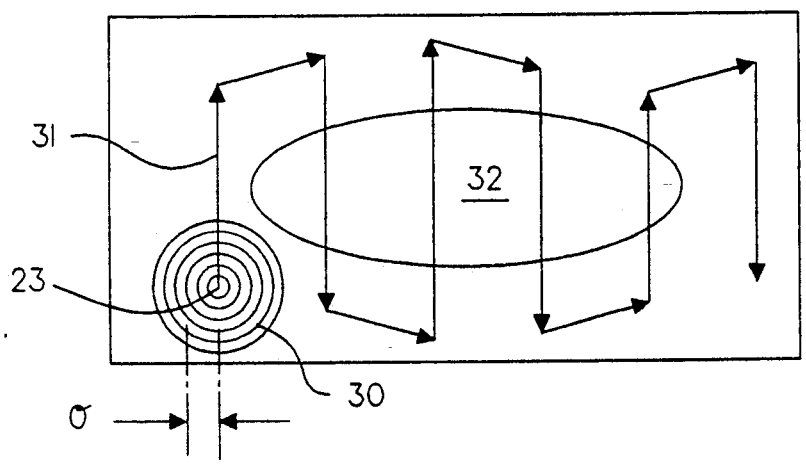
FIG. 5 is a diagram of a thermal spray pattern using a single spray gun for practicing our method.

The spray deposition must be uniform within the bounds of the masks to achieve a uniform deposition thickness. Conventional thermal spray sources typically produce Gaussian distributions. One method of producing a uniform distribution is to use a multiplicity of appropriately spaced Gaussian distribution spray patterns. The summation of identical Gaussian distributions which are spaced apart by 1.5 standard deviations produces an approximately uniform distribution in the plane passing through line 23a in FIG. 6 running between the center axis of the first Gaussian source and the center axis of the last Gaussian source. An approximately uniform distribution will also occur in and all planes of similar length parallel to the plane passing through line 23a. This uniform distribution will occur independent of the number of sources. Thus, a uniform distribution may be achieved by spraying multiple passes with a single source as shown in FIG. 5. Here a spray head 23 produces a spray pattern indicated by concentric circles 30. The pattern has a standard deviation $\sigma$. Spray head 23 is moved along path 31. All passes must be parallel and spaced by 1.5 standard deviations $\sigma$. The bounds of the spray must extend beyond the masks 32 onto the mask material 10. Alternatively a uniform distribution can be achieved using a set of spray heads 23 shown in FIG. 6 and spraying in a single pass, indicated by arrows 35. There are enough spray heads 23 to cover the limits of the largest mask boundaries. The multiple spray head method would produce faster cycles times and may be more precise relative to the single spray head method.

The mask production/spray methods so far disclosed require extremely tight control of the spray deposition to assure that a uniform, constant and repeatable thickness of material be deposited for each layer. Also, the complementary support/deposition material masks for each layer, must be accurately positioned to assure a perfect boundary between the complementary support and deposition materials.

Figure 7:
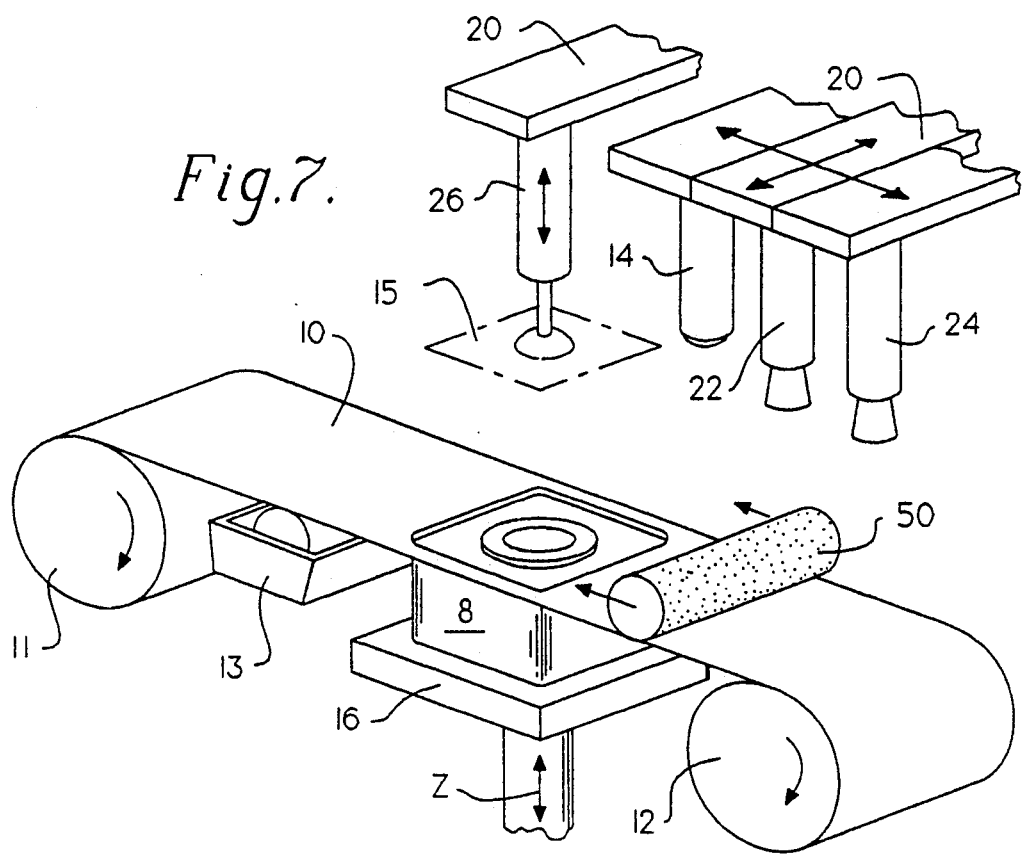
FIG. 7 is a diagram of yet a third preferred embodiment of our apparatus.
Figure 8:
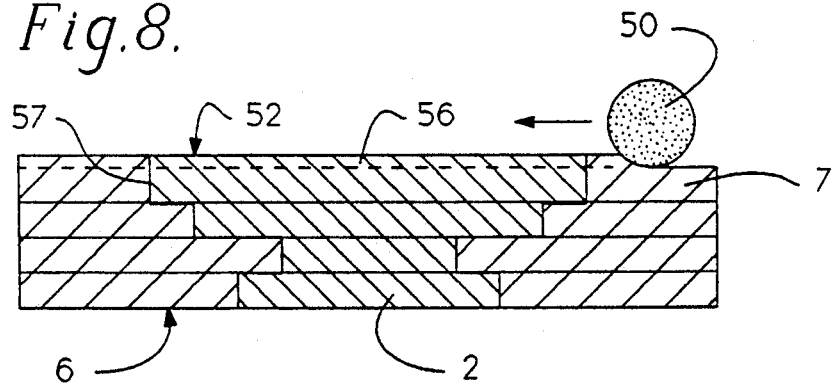
FIG. 8 is a sectional view showing grinding of the block produced with the apparatus of FIG. 7.

An alternative embodiment shown in FIGS. 7 and 8 alleviates the problem of masking inaccuracies and reduces the need for post-production finishing by incorporating a milling or grinding tool 50 to "face" each layer 7 to the exact thickness after each layer is deposited. In this embodiment, only a deposition material mask is required. First the mask for the deposition material is positioned over work table 16. The deposition material is applied and the mask is then removed. The applied deposition material is shaped as necessary. Then the complementary material is applied directly over that entire layer, without using a mask, filling in the region adjacent to the just applied deposition material as well as covering the top 52 of deposition material. A milling head or a grinding wheel 50 (or a combination of these) then passes over that layer removing the excess complementary material 56 which covers the deposition material and trimming that layer 57 to the exact thickness. The resulting milled surface should be sufficiently rough to assure bonding of the next layer to be deposited thereon. The process is then repeated for each layer until the final block of material is produced. Then the complementary material 6 is removed and the article is polished or otherwise processed as required.

Another alternative embodiment also incorporates a milling or grinding tool to "face" each application of deposition material. In this embodiment, only a complementary material mask is required. First, the mask for the complementary material is positioned over a work table. The complementary material is applied and the mask is then removed. The complementary material is then shaped to the desired contours. The deposition material is then applied over the entire layer without using a mask, filling in the region adjacent to the deposition material in the previous layer as well as covering the top of the just applied complementary material. A grinding wheel removed the excess deposition material and trims each layer to the exact thickness. The process is then repeated for each layer until the final block of material is produced. Then, the complementary material is removed.

In an alternative embodiment, the complementary material is applied first and is applied using no masks. Then a shaping means passes over the complementary material, shaping and contouring the complementary material surface so that the complementary material surface defines the surface of the object being produced for that layer. The deposition material masks are then positioned over the complementary material and the deposition material is applied. The deposition material is then shaped as desired. This process is repeated for each layer until the final block of material is produced. Then, the complementary material is removed. Conversely, one could first apply and shape the deposition material mask and apply the complementary material over the mask. Furthermore, a combination of these techniques could be used. That is, shape and mask the complementary material for selected layers, but shape and mask the deposition material in other layers.

In yet another embodiment, no masks are required. First, a layer of complementary material is applied using no masks. Then a shaping means passes over the complementary material, shaping and contouring the complementary material surface so that the surface of the complementary material defines the surface of the object being produced for that layer. The deposition material is then applied. The deposition material is then shaped as desired. This process is repeated for each layer until the final block of material is produced. Then the complementary material is removed. The converse method of first depositing and shaping the deposition material could also be used.

Any of the just described methods can be used to produce the article of FIG. 10 using the sequences of FIGS. 11 thru 16.

In FIG. 11 we show a hemispherical article 110 which can be manufactured in accordance with a sequence shown in FIGS. 11 through 16. Article 110 has a curved inner surface 112, a curved outer surface 114 and a cavity 116 that is bounded by inner surface 112. Article 110 is formed by applying several layers 118 upon a substrate 120 that is placed upon a work surface 122. Each layer 118 is composed of two types of material. The material of which article 110 is fabricated we refer to as the deposition material 124. The material that surrounds and supports article 110 is hereinafter referred to as the complementary material 126. Thus, each layer 118 that is formed consists partly of deposition material 124 and the remaining portion of each layer 118 consists of complementary material 126.

Substrate 120 is first positioned on work surface 122. A segment 125 of complementary material 126 is applied to substrate 120 by complementary material delivery means. A shaping means 130 shapes and contours at least one surface of segment 125 of complementary material 126 so that the segment 125 of complementary material 126 defines a portion of a complement to inner surface 112 of article 110 for that layer. A segment 123 of deposition material 124 is then applied upon at least one of substrate 120 and complementary material 126 by deposition material means. Shaping means 130 shapes and contours at least one surface of segment 123 of deposition material 124 so that segment 123 defines the desired surface of article 110 for that layer 118. A segment 127 of complementary material 126 is then applied upon at least one of substrate 120, deposition material 124 and complementary material 126. Shaping means 130 shapes and contours the surface of segment 127 of complementary material 126 as needed so that shaped segment 127 defines a portion of a complement to the surface of article 110 for layer 118. Thus, a layer 118 is formed that consists of a segment 123 of deposition material 124 surrounded by two segments 123 and 127 of complementary material 126. Subsequent layers 118 are applied similarly, with the exception that segment 123 of deposition material 124 is applied to at least one of substrate 120, complementary material 126 and deposition material 124. Upon completion of the process, a block 134 of complementary material 126 and deposition material 124 is produced. The complementary material 126 is then removed from block 134 leaving the deposition material 124 in the shape of article 110. Because at least a portion of each layer was shaped as it was created, the article 110 should be in or very close to its desired shape.

In the above described process of fabricating article 110, two segments of deposition material 124 and two segments of complementary material 126 are formed on layer 118. Two segments of deposition material 124 are needed for this layer because one segment contacts and defines inner surface 112 of article 110 and the other segment of complementary material 126 contacts and defines outer surface 114. Thus, for each cross-sectional layer 118 that is formed, a segment 127 of complementary material 126 surrounds the outer surface 114 of article 110, and an additional segment of complementary material will be applied for each cavity or passageway through a given layer 118. Additionally, if a given cross sectional layer 118 requires more than one section of deposition material and these sections are not connected, then a segment of deposition material will be applied for each such section.

The effect of shaping the complementary material is that much less, and in some instances no further machining of the finished object is necessary once the process is complete. The deposition material can also be shaped after it has been sprayed. This will enable objects having curved outer surfaces to be more easily produced. Because the interface between the complementary material and deposition material may change direction from one layer to the next, it is understood that it may be preferable to shape the deposition material for one layer and to shape the complementary material for the next layer.

Figure 9:
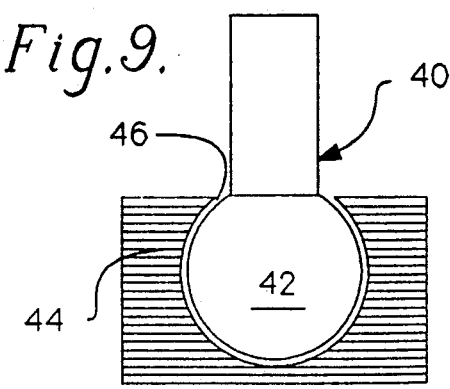
FIG. 9 is a cross section of a ball joint which can be made in accordance with the present invention.

The solid-freedom fabrication system disclosed here would also permit the fabrication of complete functional assemblies containing two or more mating parts in one process without the requirement of discrete assembly operations. In FIG. 9 we show a ball joint 40 having a ball head 42 in a socket 44 separated by space 46. This part can be made such that ball head 42 is one material and socket 44 is a second material. During fabrication a complementary material is deposited to fill space 46 and surround head 42 and socket 44. For example, the socket 44 may be steel, the ball head 42 a composite, and the complementary material can be Cerro metal. Upon application of the materials, the workpiece is heated to melt away the Cerro metal, leaving the assembly shown in FIG. 9. Variations of the preferred embodiment can be employed. For example, although several preferred means of producing the masks are disclosed, any means of producing the masks could be employed.

Although the preferred means of delivering the deposition material and complementary material is by thermal spray deposition, any suitable means such as a liquid slurry, a gravity feed device or a manual device such as a hand sifter may be used. Also, although we show the spray heads 22, 24 and 25 on a single mounting head 20 in the apparatus of FIG. 2. It should be understood that separate mounting heads could be provided for each spray head or for selected combinations of spray heads.

While we have described certain preferred embodiments of our apparatus and method, it should be distinctly understood that our invention is not limited thereto, but may be variously embodied with the scope of the following claims.

We claim:

1. A method for the fabrication of a three dimensional article having a desired shape comprising the steps of
    a) sequentially applying a series of layers, each said layer comprised of deposition material, each said layer being applied onto at least one of a substrate and another layer;
    b) removing material from at least one surface of a plurality of selected layers after each selected layer has been deposited to shape a portion of an outside surface of the article being fabricated to any desired form; and
    c) depositing at least one layer of deposition material over at least one of the plurality of selected layers from which material has been removed, the at least one layer of deposited deposition material not being deposited over the outer surface from which material has been removed.

2. The method of claim 1 also comprising the step of further processing the article after all layers have been deposited as required to produce a final form of the three dimensional article.

3. The method of claim 2 wherein the step of further processing the article includes polishing the article.

4. A method for the fabrication of a three dimensional article having a desired shape comprising the steps of
   a) sequentially applying a series of layers, each said layer comprised of at least one segment of a complementary material and at least one segment of a deposition material, each said layer being applied onto at least one of a substrate and another layer;
   b) removing material from at least one surface of a plurality of selected segments of said complementary material before applying a selected layer of deposition material so that said complementary material defines a complement to said desired shape;
   c) depositing at least one layer of complementary material over at least one of the plurality of selected segments from which material has been removed, the at least one layer of deposited complementary material not being deposited over the surface from which material has been removed; and
   d) removing said complementary material from said applied deposition material.

5. The method of claim 4 further comprising the step of removing material from at least one surface of selected segments of said deposition material so that said deposition material is shaped to said desired shape.

6. The method of claim 4 wherein said complementary material has a melting point below a melting point of said deposition material.

7. The method of claim 4 wherein said complementary material is metal alloy having a melting temperature between approximately 150° to 340° F. and said deposition material is a steel.

8. The method of claim 4 wherein said complementary material is selected from the group consisting of a metal, a metal alloy, a ceramic, a plastic and a composite thereof.

9. The method of claim 4 wherein said deposition material is selected from the group consisting of a metal, a ceramic, a plastic and a composite thereof.

10. The method of claim 4 wherein at least one of said complementary material and said deposition material are applied by thermal spray deposition.

11. The method of claim 4 wherein at least one of said complementary material and said deposition material are applied by liquid slurry.

12. The method of claim 4 also comprising the step of further processing the article after all layers have been deposited as required to produce a final form of the three dimensional article.

13. The method of claim 12 wherein the step of further processing the article includes polishing the article.

14. A method for the fabrication of a three dimensional article having a desired shape comprising the steps of
   a) creating a first set of masks, each mask corresponding to at least a portion of a cross section through said article such that there is at least one mask in said first set for every parallel cross section through said article normal to a centerline through said article;
   b) creating a second set of masks, each mask corresponding to at least one mask from said first set of masks and defining a complement to a cross section defined by a corresponding mask from said first set of masks;
   c) alternatively placing on a substrate at least one mask from said first set and then at least one mask from said second set in accordance with a predetermined sequence;
   d) applying a complementary material over at least one mask selected from said second set of masks placed on at least one of said substrate, any complementary material on said substrate and any deposition material on said substrate to form at least one segment of said complementary material;
   e) removing said mask selected from said second set of masks after applying said complementary material;
   f) shaping at least one surface of selected segments of said complementary material so that said complementary material defines a complement to said desired shape;
   g) applying deposition material over at least one mask selected from said first set of masks and placed on at least one of said substrate, any deposition material on said substrate and any complementary material on said substrate to form a segment of deposition material;
   h) removing said mask selected from said second set of masks after applying said deposition material; and
   i) removing said complementary material from said applied deposition material.

15. The method of claim 14 further comprising the step of shaping at least one surface of selected segments of said deposition material to said desired shape.

16. The method of claim 14 wherein said masks are selected from the group consisting of foil, plastic, paper and pressure sensitive paper.

17. The method of claim 14 wherein pairs of masks from said first set of masks define at least some of said cross sections through said article with each pair of masks defining a single cross section.

18. A method for the fabrication of a three dimensional article having a desired shape and having a set of parallel cross sections through said article and normal to a centerline through said article comprising the steps of
   a) creating a first set of masks, each mask corresponding to at least a portion of a cross section through said article such that there is at least one mask in said first set for every parallel cross section through said article normal to a centerline through said article;
   b) placing on a work surface at least one mask selected from said first set of masks;
   c) applying deposition material over the at least one mask selected from said first set of masks and placed on said work surface;
   d) removing said mask selected from said first set of masks after applying said deposition material;
   e) shaping of at least one surface of selected layers of deposition material;
   f) applying a complementary material over at least one of said substrate, any complementary material on said substrate and any deposition material on said substrate to form a segment of complementary material and deposition material;
   g) repeating said aforementioned steps until each of said parallel cross sections has been applied; and h) removing said complementary material from the deposition material.

19. The method of claim 18 wherein said repeating steps of placing said mask from said first set of masks and applying said disposition material are performed after said steps of applying and shaping said disposition material.

20. A method for the fabrication of a three dimensional article having a desired shape and having a set of parallel cross sections through said article and normal to a centerline through said article comprising the steps of
a) creating a set of masks, each mask corresponding to a cross section through said article;
b) placing on a substrate at least one mask selected from said set of masks;
c) applying a complementary material over at least one mask selected from said set of masks and placed on at least one of said substrate, any complementary material on said substrate, and any deposition material on said substrate to form at least one segment of complementary material;
d) after applying said complementary material removing said mask selected from said set of masks which was placed prior to applying said complementary material;
e) shaping at least one surface of selected segments of said complementary material so that said complementary material defines a complement to said desired shaped;
f) applying deposition material over at least one of said substrate, any deposition material on said substrate and any complementary material on said substrate to form a segment of deposition material;
g) repeating said aforementioned steps until each of said parallel cross sections has been applied; and
h) removing said complementary material from said applied deposition material.

* * * * *

UNITED STATES PATENT AND TRADEMARK OFFICE
CERTIFICATE OF CORRECTION

PATENT NO. : 5,301,415
DATED : April 12, 1994
INVENTOR(S) : FRITZ B. PRINZ, LEE E. WEISS It is certified that error appears in the above-indentified patent and that said Letters Patent is hereby corrected as shown below:

Column 13, line 5, change "disposition" to --deposition--.

Column 13, line 6, change "disposition" to --deposition--.

Signed and Sealed this

Twentieth Day of September, 1994

Attest:

BRUCE LEHMAN

*Attesting Officer*  *Commissioner of Patents and Trademarks*